(12) United States Patent
Mehta et al.

(10) Patent No.: US 11,334,466 B2
(45) Date of Patent: May 17, 2022

(54) REMEDYING BAD SERVICE FIXES HAVING SUBSEQUENT DEPENDENT FIXES

(71) Applicant: INTERNATIONAL BUSINESS MACHINES CORPORATION, Armonk, NY (US)

(72) Inventors: Payal Mehta, Woking (GB); Stephen Evans, Hampshire (GB); Ian M. Hodges, Horton Heath (GB); Stephen Hurst, Four Marks (GB); Michael Vrakopoulos, Southampton (GB); Andrew Wright, Chandlers Ford (GB); Daniel Jeffrey, Southampton (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 12 days.

(21) Appl. No.: 16/141,093

(22) Filed: Sep. 25, 2018

(65) Prior Publication Data
US 2020/0097385 A1 Mar. 26, 2020

(51) Int. Cl.
*G06F 11/36* (2006.01)
*G06F 7/08* (2006.01)

(52) U.S. Cl.
CPC ............ *G06F 11/3608* (2013.01); *G06F 7/08* (2013.01)

(58) Field of Classification Search
CPC ............................. G06F 11/3608; G06F 7/08
USPC ........................................................ 717/133
See application file for complete search history.

(56) References Cited

U.S. PATENT DOCUMENTS

| 9,183,200 | B1* | 11/2015 | Liu ..................... G06F 16/278 |
| 2004/0015938 | A1* | 1/2004 | Taylor ..................... G06F 8/65 717/168 |
| 2005/0005268 | A1* | 1/2005 | Zilavy ................... G06F 9/4411 717/170 |
| 2006/0005182 | A1* | 1/2006 | Butterweck ............... G06F 8/60 717/175 |
| 2006/0064685 | A1* | 3/2006 | DeFolo ................... G06F 8/658 717/169 |
| 2010/0169874 | A1 | 7/2010 | Izard |
| 2010/0218176 | A1 | 8/2010 | Spanner |
| 2014/0101651 | A1 | 4/2014 | Li |
| 2014/0115183 | A1* | 4/2014 | Mitsunobu .............. H04L 47/22 709/232 |
| 2014/0237462 | A1* | 8/2014 | Zheng ..................... G06F 8/62 717/170 |

(Continued)

*Primary Examiner* — Chat C Do
*Assistant Examiner* — Bradford F Wheaton
(74) *Attorney, Agent, or Firm* — Cantor Colburn LLP; Teddi Maranzano (57) ABSTRACT

A computer-implemented method includes identifying a bad fix to a software product, where the software product includes a plurality of parts, and where the bad fix presents an error into a first part. A plurality of fixes to the software product, including the bad fix, are representable by a dependency graph indicating dependencies among the plurality of fixes. The dependency graph is recursively traversed to identify a subset of fixes that are dependent on the bad fix, where each fix in the subset of fixes includes a respective set of parts, and to add a reference to a respective most recent version of each part of each fix in the subset of fixes to a parts datastore. A remedial part and each part referenced in the parts datastore are packaged into a remedial fix, where the remedial part includes a correction to the error in the first part.

11 Claims, 5 Drawing Sheets

(56) References Cited

U.S. PATENT DOCUMENTS

| | | | | |
|---|---|---|---|---|
| 2015/0178063 A1 | 6/2015 | Narkinsky | | |
| 2015/0378710 A1* | 12/2015 | Kabue | ............ | G06F 8/70 |
| | | | | 717/168 |
| 2015/0378845 A1* | 12/2015 | Shang | ............ | G06F 16/1865 |
| | | | | 707/648 |
| 2016/0292066 A1* | 10/2016 | Stevens | ............ | G06F 11/3624 |
| 2019/0012151 A1* | 1/2019 | Holbrook | ............ | G06F 8/34 |
| 2019/0235850 A1* | 8/2019 | Mukherjee | ............ | G06F 8/65 |

\* cited by examiner

REMEDYING BAD SERVICE FIXES HAVING SUBSEQUENT DEPENDENT FIXES

BACKGROUND

The present invention relates to software service fixes and, more specifically, to remedying bad service fixes that have subsequent dependent fixes.

From time to time, a software product may require a fix, either to correct a bug or to add or modify features. Generally, a fix, also referred to as a service fix or a patch, is installed on top of the software product and, further, on top of prior fixes. In some software products, fixes are developed and supplied on a part by part basis. A part is a small, serviceable unit, such as an object module or a source sample. A particular fix modifies one or more distinct parts, and in some cases, a fix can modify thousands of parts. Generally, a fix includes only the parts being modified and does not require modification of other parts of the software product.

Because each fix can address multiple parts, sometimes fixes intersect, which is the case when fixes service a common part. For instance, a first fix that modifies parts A, B, and C of a software product intersects with a second fix that modifies parts C, D, and E. Because both fixes modify part C, these fixes intersect. For fixes that intersect, a relationship may exist between the fixes, where that relationship provides guidance as to how those fixes should be installed with respect to each other. The relationship of another fix to a first fix can be one of the following:

PRE: Prerequisite. To install the first fix on a computer system, the computer system must have each prerequisite fix installed.

SUP: Supersedes. A superseding fix totally replaces the corresponding superseded fix, updating all parts that the superseded fix updated or created. Any relationships involving the superseded fix must be brought forward into the superseding fix, and the superseded fix need not be applied if not yet applied.

Thus, installation of a fix is not achieved by simply over copying existing files on the target computer system. Rather, an installation management program can be used to manage the versions of each part in a software product, as well as the state of each existing fix. Specifically, the installation management program maintains a graph of all existing fixes, showing how the fixes relate to one another. Each new fix adds a new node to the graph and also adds one or more edges indicating relationships. As fixes are developed, the graph can become complex. A service tool for developers contains the complete graph, with all fixes and all relationships, but each computer system used by a customer maintains a respective graph applicable to that computer system. On such a computer system, the graph is a subset of the complete graph, as it is likely that not all fixes have been installed. Given the numerous combinations in which fixes can be installed, numerous versions of the software product, including fixes, can exist across computer systems.

When a new fix is packaged (i.e., rolled into installable files and ready for distribution), a service packaging tool used by fix developers utilizes the service history for each part in the new fix to determine which other fixes are prerequisites of, or superseded by, the new fix. This relationship information is stored within the packaging of the fix and defines fixes that a customer needs to install before or alongside the new fix. If this were not enforced by the software installation process, failures could result during installation or during later execution of the software product.

Thus, each fix includes in its packaging an indication of where it fits in the graph. Thus, when a computer system begins installation of the fix, the installation process can notify a user of any necessary other fixes that require installation. The installation process ensures that dependencies are satisfied with respect to the fix being installed and related fixes.

For a large software product, fixes are sometimes developed in parallel, and those fixes are potentially intersecting. A normal development pipeline will have numerous fixes under development at a time. This pipeline of fixes might be packaged serially, in quick succession, before the final stage of testing takes place. Then the fixes are installed together for testing.

SUMMARY

Embodiments of the present invention are directed to a computer-implemented method for generating a remedial fix to correct a bad fix. A non-limiting example of the computer-implemented method includes identifying a bad fix to a software product, where the software product includes a plurality of parts, and where the bad fix presents an error into a first part of the software product. A plurality of fixes to the software product are representable by a dependency graph indicating dependencies among the plurality of fixes to the software product, and the bad fix is among the plurality of fixes. The dependency graph is recursively traversed to identify a subset of fixes that are dependent on the bad fix, where each fix in the subset of fixes includes a respective set of parts, and to add a reference to a respective most recent version of each part of each fix in the subset of fixes to a parts datastore. A remedial part and each part referenced in the parts datastore are packaged into a remedial fix, where the remedial part includes a correction to the error in the first part.

Embodiments of the present invention are directed to a system for generating a remedial fix to correct a bad fix. A non-limiting example of the system includes a memory having computer-readable instructions and one or more processors for executing the computer-readable instructions. The computer-readable instructions include identifying a bad fix to a software product, where the software product includes a plurality of parts, and where the bad fix presents an error into a first part of the software product. A plurality of fixes to the software product are representable by a dependency graph indicating dependencies among the plurality of fixes to the software product, and the bad fix is among the plurality of fixes. Further according to the computer-readable instructions, the dependency graph is recursively traversed to identify a subset of fixes that are dependent on the bad fix, where each fix in the subset of fixes includes a respective set of parts, and to add a reference to a respective most recent version of each part of each fix in the subset of fixes to a parts datastore. A remedial part and each part referenced in the parts datastore are packaged into a remedial fix, where the remedial part includes a correction to the error in the first part.

Embodiments of the invention are directed to a computer-program product for generating a remedial fix to correct a bad fix, the computer-program product including a computer-readable storage medium having program instructions embodied therewith. The program instructions are executable by a processor to cause the processor to perform a method. A non-limiting example of the method includes identifying a bad fix to a software product, where the software product includes a plurality of parts, and where the bad fix presents an error into a first part of the software product. A plurality of fixes to the software product are representable by a dependency graph indicating dependencies among the plurality of fixes to the software product, and the bad fix is among the plurality of fixes. Further according to the method, the dependency graph is recursively traversed to identify a subset of fixes that are dependent on the bad fix, where each fix in the subset of fixes includes a respective set of parts, and to add a reference to a respective most recent version of each part of each fix in the subset of fixes to a parts datastore. A remedial part and each part referenced in the parts datastore are packaged into a remedial fix, where the remedial part includes a correction to the error in the first part.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, a software bug might be found in a fix during the final testing phase, which occurs after packaging of the fix and other fixes in the pipeline. The existence of the software bug is due to one or more parts being in error or, in other words, having an error in one or more parts of the fix. Herein, a fix that introduces a part in error is referred to as a bad fix. Among other existing fixes, particularly those in the pipeline at the same time as the bad fix, some might depend on installation of the bad fix. Thus, to install these other fixes, if they are shipped in their current state, installation of the bad fix would be required. As a result, customers desiring to install those related fixes would be forced to acquire a part in error. Additionally, if the bad fix is released, it becomes possible for a customer to install the bad fix but choose not to install a later remedial fix, thus leading to a further instability of the software product.

Turning now to an overview of the aspects of the invention, one or more embodiments of the invention address the above-described shortcomings of the prior art by providing a mechanism to combine multiple fixes that are dependent on a bad fix, each with a respective set of relationships, into a remedial fix that supersedes each such fix. To this end, according to some embodiments of the invention, a packaging tool starts with the bad fix and adds the parts of the bad fix to a list. The packaging tool recursively examines the parts in the list, adding parts of dependent fixes to the list such that the list grows as needed while it is recursively examined. The most recent version of each such part is added to a remedial fix for packaging, along with a patch for the part in error of the bad fix.

The above-described aspects of the invention address the shortcomings of the prior art by providing a final fix that is remedial and supersedes all fixes affected by the bad fix. As a result, if a dependent fix affected by the bad fix has been installed (e.g., as a pre-release version) on a computer system, then that dependent fix need not be uninstalled. Further, the dependent fixes affected by the bad fix need not be released at all. As such, it is no longer necessary to determine, on a system by system basis, which fixes need to be uninstalled, installed, or reinstalled in order address the bad fix. Installation thereby becomes less complex due to embodiments of the invention, and usability is improved from the perspective of users, while preserving accurate dependencies within the graph on the computer system. Because fixes can intersect and include thousands of parts, recognizing dependencies and generating a superseding remedial fix, as discussed herein, is nontrivial and cannot be performed manually.

Figure 1:
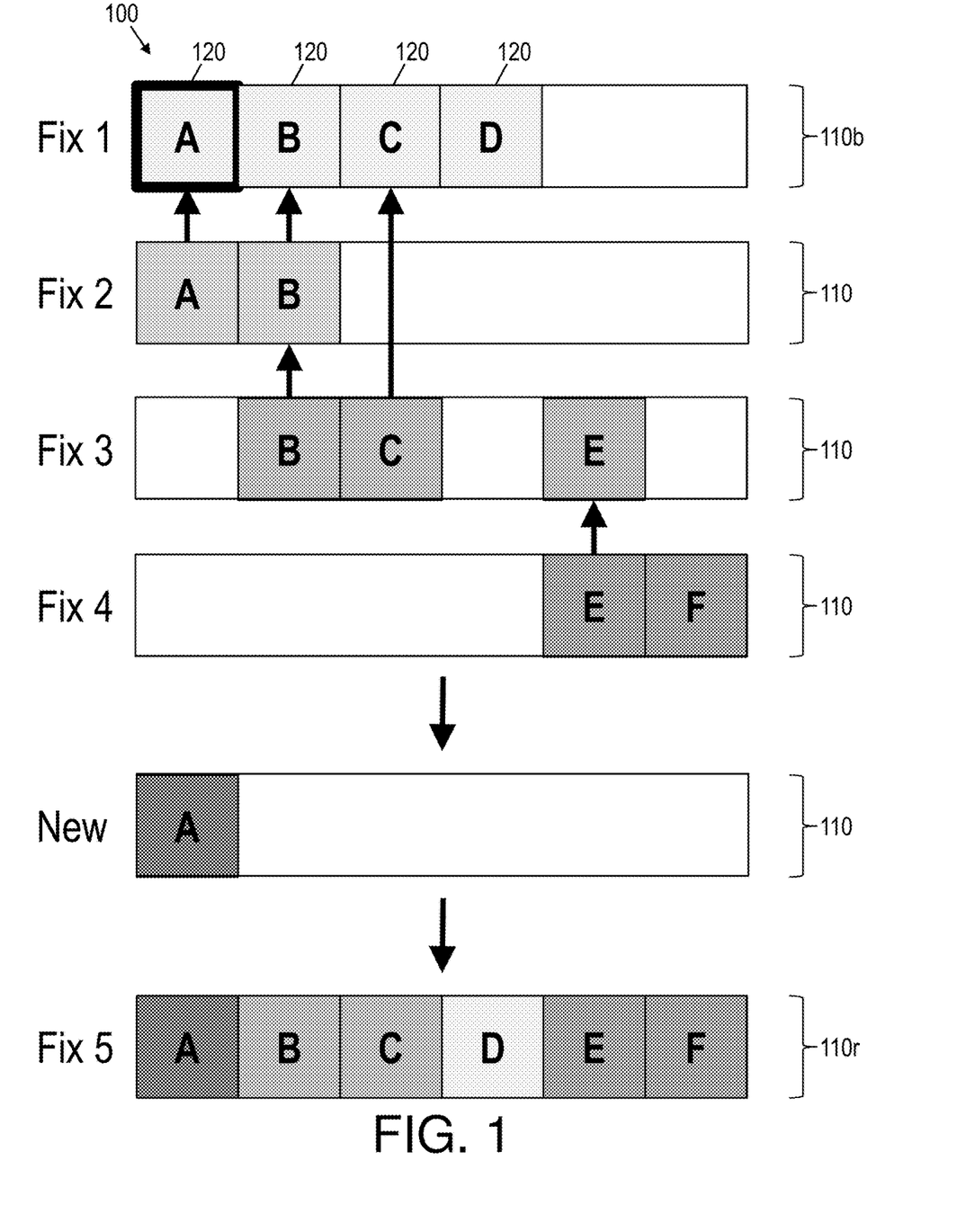
FIG. 1 illustrates a packaging system for remedying a bad service fix at the packaging stage, according to some embodiments of the invention.

Turning now to a more detailed description of aspects of the present invention, FIG. 1 illustrates a packaging system 100 for remedying a bad service fix 110b, specifically Fix 1, at the packaging stage, according to some embodiments of the invention. In some embodiments of the invention, the packaging system 100 remedies the issue of dependencies on bad fixes 110, at the packaging level. As a result, each user can install a common patch to address the bad fix 110b, regardless of which version of the software product exists on the user's computer system. As shown in FIG. 1, the packaging system 100 generates a remedial fix 110r, specifically Fix 5, that is made up of one or more parts 120, where the versions of those parts 120 are extracted from fixes 110 dependent on the bad fix 110b.

Specifically, FIG. 1 illustrates an example of fixes 110 dependent on a bad fix 110b, illustrating the complexity of the problem and, at a high-level, the solution provided by the packaging system 100. In this example, Fix 1 modifies four parts 120 of a software product, specifically Parts A, B, C, and D. Fixes 2, 3, and 4 depend on Fix 1, either directly or indirectly. Specifically, Fix 2 modifies Parts A and B and has Fix 1 as a prerequisite.

In this example, Fix 1 is a bad fix 110b, in that it includes a part in error, specifically Part A. It will be understood that Fix 1 need not be the first ever fix 110 to the software product. However, for the sake of this example, it will be assumed that Fix 1 is the first bad fix 110b on which the other fixes 110 illustrated depend. Fix 2 intersects with Fix 1 and thus has Fix 1 as a prerequisite because both fixes address Part A and Part B. Fix 3 intersects with, and thus depends directly on, both Fix 1 and Fix 2. Specifically, Fix 3 has Part B in common with Fix 2, which depends on Fix 1 due to a different part 120, and Part C in common with Fix 1. Fix 4 depends indirectly on the bad fix 110b, Fix 1, because of the intersection of Fix 4 with Fix 3 at Part E, and Fix 3 depends on Fix 1. As a result, each of Fixes 2, 3, and 4 are affected by the bad fix 110b.

According to some embodiments of the invention, the packaging system 100 takes a potential new fix 110 for Part A, designed to address the error resulting from Fix 1, and combines it in packaging with the latest versions of all the parts 120 in fixes 110 that depend on the bad fix 110b. In some embodiments of the invention, the potential new fix 110 is not yet a proper fix 110 as it does not yet contain additional components required for it to be a remedial fix 110r. Specifically, the latest version of Parts B, C, D, E, and F may be incorporated in a remedial fix 110r, Fix 5. In some embodiments of the invention, this is nontrivial to do because, for example, while Part E can simply be copied from Fix 4 into Fix 5, because Part E in Fix 4 encompasses the changes made in Fix 3, Parts B and C must also be included from Fix 3 to ensure compatibility with Part E of Fix 3. The packaging system 100 may examine these dependencies to intelligently combine the parts 120 into a remedial fix 110r that supersedes the fixes 110 dependent on the bad fix 110b.

Figure 2:
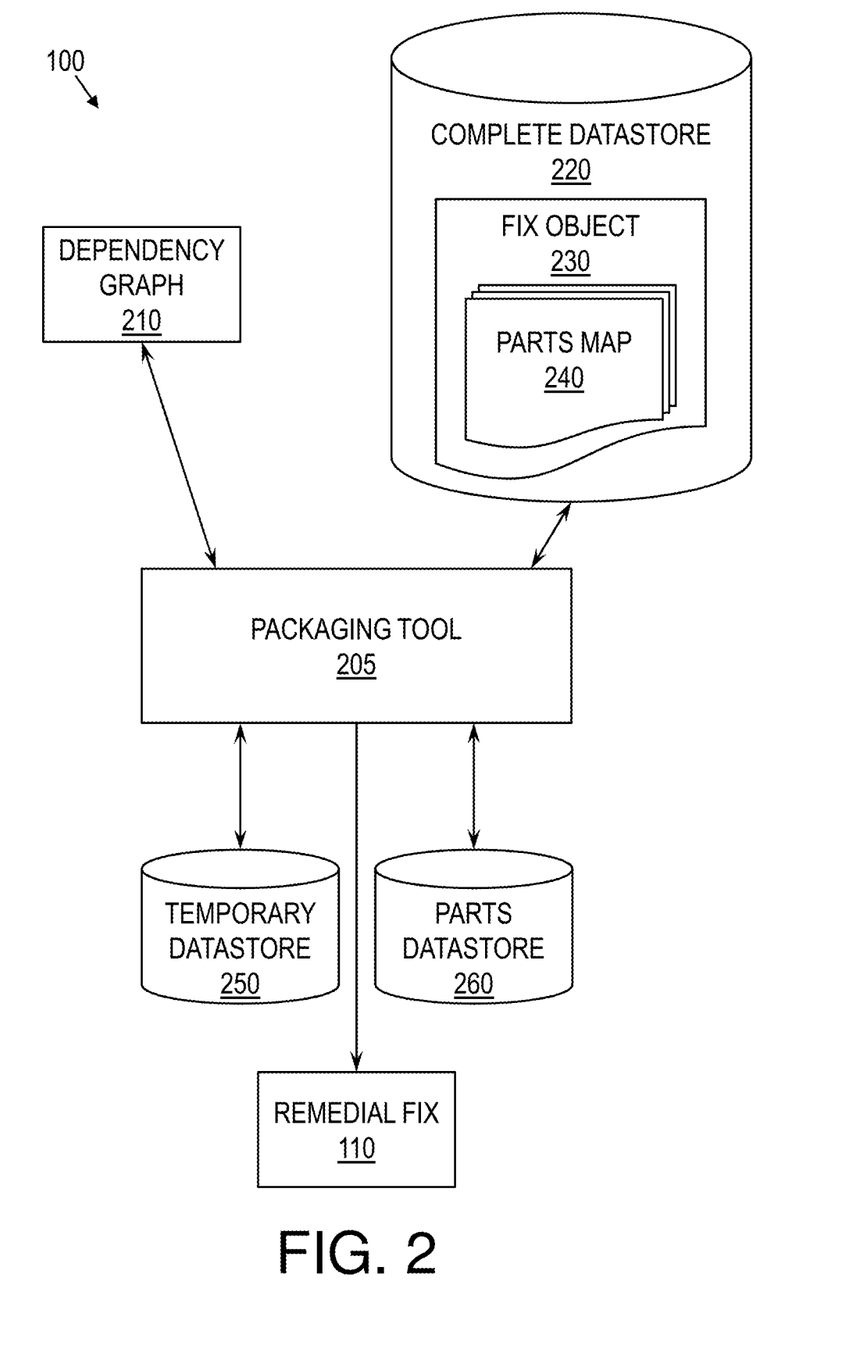
FIG. 2 is a block diagram of the packaging system according to some embodiments of the invention.

FIG. 2 is a block diagram of the packaging system 100 according to some embodiments of the invention. The packaging system 100 may be embodied in a packaging tool 205. The packaging tool 205 may include hardware, software, or a combination of both. For example, and not by way of limitation, the packaging tool 205 may be one or more software modules or specialized hardware circuits, or a combination of these. As shown in FIG. 2, the packaging tool 205 may have access to a dependency graph 210 and a complete datastore 220, both related to a software product. According to this disclosure, the term "datastore" refers to a collection of one or more storage objects for data, such as one or more databases, database tables, files, or other storage objects capable of performing the tasks described herein as attributed to a datastore. The dependency graph 210 may be a tree indicating dependencies between the various patches that have been committed or are in development for the software product. It will be understood that the dependency graph 210 may, but need not, be represented graphically. For example, and not by way of limitation, a set of fix objects 230, each of which reference dependent fix objects 230, may together describe a dependency graph, even without that dependency graph being generated as a graphic. In some embodiments of the invention, the complete datastore 220 maintains data describing the various fixes 110 for the software product, as well as the relationship between those fixes 110. It will be understood that the packaging tool 205 may be able to package fixes 110 for multiple software products, and in that case, the packaging tool 205 may have access to the respective dependency graph 210 and the respective complete datastore 220 for each such software product.

Each fix 110 may be representable by a fix object 230, and each fix 110 may be represented in the complete datastore 220 by a respective fix object 230 that describes the fix 110. In other words, a fix object 230 may reference a respective fix 110 that it represents. It will be understood by one skilled in the art that various data structures may be used to represent fixes 110 and parts 120, and that the data structures described herein are illustrative and not restrictive.

For example, and not by way of limitation, as shown in FIG. 2, a fix object 230 may be represented as a combination of at least the following, which may be stored together in a data structure: FixID, CommitID, a parts map 240 describing parts included in the fix 110, a list of fix identifiers of prerequisites to the fix 110, and a list of fix identifiers of fixes 110 superseded by the fix 110. The FixID, also referred to as a fix identifier, is a unique identifier, such as a name or numeral, of the fix 110 represented; and the CommitID is a unique identifier indicating where the fix 110 ranks in the order in which fixes 110 for the software product were added to the complete datastore 220. In other words, in some embodiments of the invention, the CommitID is a unique sequencing identifier. The CommitID may thus reflect the chronological order of fixes 110. A parts map 240 may include a set of pairs, with each pair representing a part 120 in the fix 110 represented, and with each pair including a part name and a link to the respective part 120 itself (e.g., to the object module or source sample making up the part 120).

As will be described in detail below, the packaging tool 205 may recursively traverse the dependency graph 210, by following references in the fix objects 230 of the complete datastore 220, to package a remedial fix 110r that supersedes that bad fix 110b and all fixes 110 dependent on the bad fix 110b. To this end, the packaging tool 205 may utilize a temporary datastore 250, which may temporarily maintain fixes 110 for examination in determining which parts 120 to include in the remedial fix 110r. In some embodiments of the invention, the temporary datastore 250 is maintained as a linked list of fix objects 230, but it will be understood that other data structures could be used. The packaging tool 205 may also utilize a parts datastore 260, which may maintain parts 120 to be incorporated in the remedial fix 110r. Each part in the parts datastore 260 may be represented as a pair, or couple, including the respective part name and a link to the respective part 120 itself.

Figure 3A:
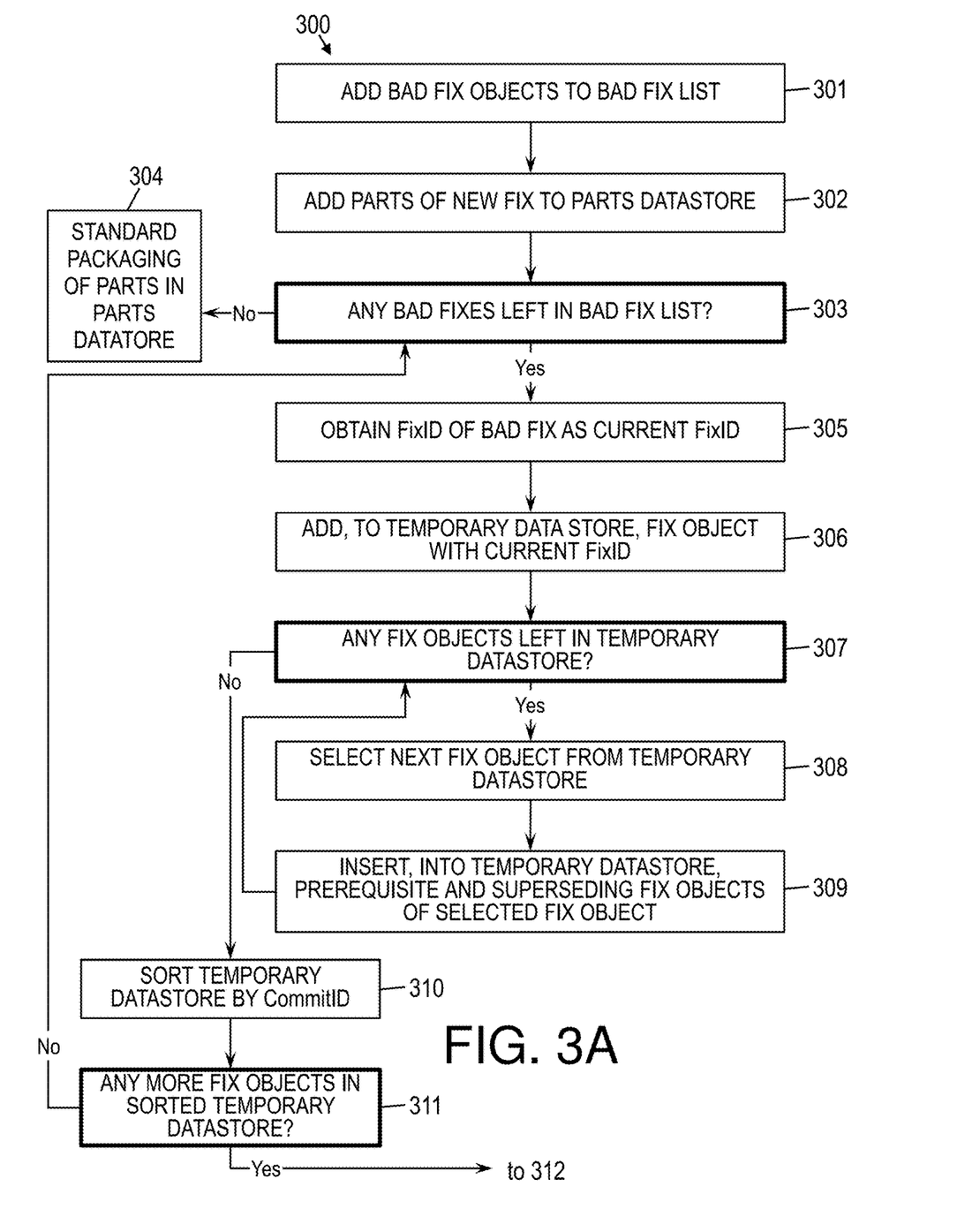
FIGS. 3A-3B together form a flow diagram of a method of remedying a bad service fix at the packaging stage, according to some embodiments of the invention.
Figure 3B:
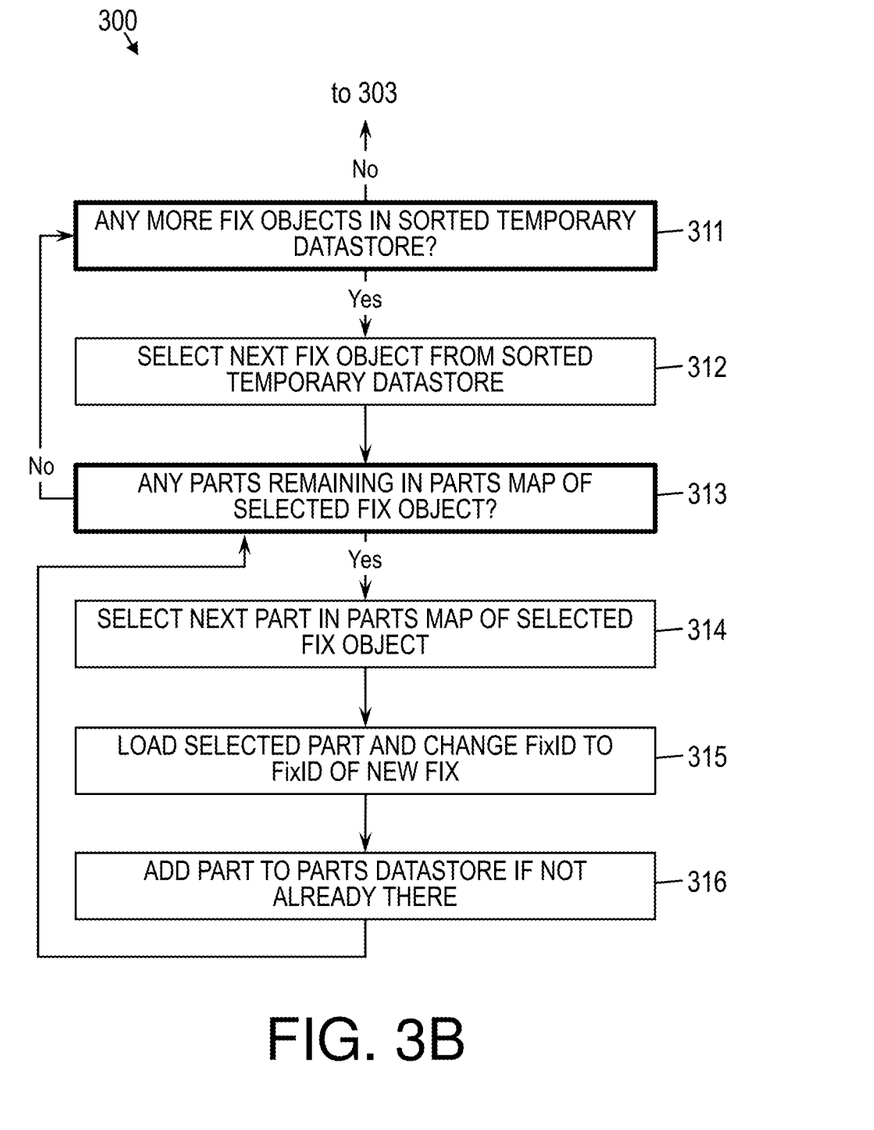

FIGS. 3A-3B together form a flow diagram of a method 300 of remedying a bad service fix 110b at the packaging stage, according to some embodiments of the invention. Although FIG. 1 shows one bad fix 110b and three known dependent fixes 110, a person of skill in the art will understand that one or multiple bad fixes 110b, with one or more parts in error, as well as one or multiple dependent fixes 110 may be corrected with a single remedial fix 110r.

As shown in FIG. 3A, at block 301, bad fix objects 230 representing the bad fixes 110 are added to a bad fix list. At block 302, the various parts 120 of a potential new fix 110 are added to the parts datastore 260, which will eventually be used in packaging the remedial fix 110r. In some embodiments of the invention, the potential new fix 110 is simply one or more remedial parts 120 designed to remedy at least one or more parts in error. As discussed above, each part 120 in the parts datastore 260 may be represented by a part name and a link to the part 120 itself.

Decision block 303 begins an outer iterative loop of addressing each bad fix 110b on the bad fix list. At decision block 303, it may be determined whether any bad fixes 110b have not yet been considered in the bad fix list. If no bad fixes 110b remain for consideration in the bad fix list, then at block 304, standard packaging of the parts 120 in the parts datastore 260 proceeds, and all the fixes 110 represented in the temporary datastore 250 are canceled in the complete datastore 220. The method 300 then ends. This standard packaging results in the remedial fix 110r, which may supersede all committed fixes 110 that depend on the known bad fixes 110b, either directly or indirectly.

If there are bad fixes 110b remaining on the bad fix list, then the FixID of the bad fix 110b at the start of the list may be obtained, at block 305. The FixID is referred to below as the current FixID. At block 306, the packaging tool 205 may obtain, from the complete datastore 220, the fix object 230 corresponding to the bad fix 110b having the current FixID, and the packaging tool 205 may add this fix object 230 to the temporary datastore 250.

Decision block 307 begins a first inner iterative loop across the fix objects 230 in the temporary datastore 250. This inner loop runs within the outer loop that began above at block 303. For this inner loop, the fix objects 230 in the temporary datastore 250 may be considered in the order in which they were added to the temporary datastore 250. At decision block 307, it may be determined whether any fix objects 230 have not yet been considered in the temporary datastore 250. If a fix object 230 remains for consideration, then the next fix object 230 in the temporary datastore 250 may be selected, at block 308. At block 309, the packaging tool 205 may obtain, from the complete datastore 220, the fix objects 230 that contain the current FixID in at least one of their respective lists of prerequisite fixes 110 or superseded fixes 110, and the packaging tool 205 may insert into the temporary datastore 250 each such fix object 230 that is not yet in the temporary datastore 250. The method 300 may then return to block 307. In other words, with this inner loop, the packaging tool 205 may recursively examine fix objects 230 in the temporary datastore 250 to identify fixes 110 for which the current FixID is a prerequisite or superseded fix 110 and to add those respective fix objects 230 into the temporary datastore 250, until all such fix objects 230 have been examined.

When the temporary datastore 250 has no more fix objects 230 to examine, then the packaging tool 205 may sort the temporary datastore 250 in order of descending CommitID, at block 310. In other words, the most recently committed fix 110 may be first, and the other fixes 110 may be sorted according to how recently they were committed. The method 300 then continues to decision block 311, which is in FIG. 3B.

As shown in both FIG. 3A and FIG. 3B, decision block 311 begins another inner loop over the fix objects 230 in the temporary datastore 250. This loop may begin at the start of the sorted temporary datastore 250. At decision block 311, it may be determined whether the temporary datastore 250 includes any fix objects 230 not yet considered in the present inner loop. If not, then this inner loop ends, and the method 300 may return to decision block 303, shown on FIG. 3A, to determine whether any bad fixes 110 remain for consideration. If an additional fix object 230 remains in the temporary datastore 250, then such a fix object 230 may be selected, at block 312, as shown on FIG. 3B.

A shown in FIG. 3B only, decision block 313 begins a further inner loop, which operates inside the inner loop that began at decision block 311. At decision block 313, it may be determined whether any parts 120 remain to be considered in the parts map 240 of the selected fix object 230. If no such parts 120 remain for consideration, then this inner loop may end, and the method 300 may return to block 311, to determine whether any fix objects 230 remain to be considered. However, if a part 120 remains in the parts map 240 of the selected fix object 230, then one such part 120 may be selected at block 314. At block 315, the part 120 itself may be loaded (e.g., the data the makes up the part 120), and the FixID of the part 120 may be replaced inside the part 120 with the FixID of the remedial fix 110r. At block 316, the selected part 120 may be added to the parts datastore 260 if that part 120 is not already in the parts datastore 260. Specifically, a parts map 240, including the part name and the link to the part 120, may be added to the parts datastore 260. The method 300 may then return to decision block 313 to determine whether any additional parts 120 remain to be considered in the selected fix object 230.

When there are no more parts 120 to be considered in the selected fix object 230, then the method may return to decision block 311 with the end of the innermost loop, and when there are no more fix objects 230 to be considered in the temporary datastore 250, then the method 300 may return to decision block 303, shown on FIG. 3A, with the end of the current inner loop. When all bad fixes 110 have been addressed at decision block 303, then the outer loop may end. At that point, standard packaging may proceed on the parts 120 represented in the parts datastore 260, and the fixes 110 in the temporary datastore 250 are canceled in the complete datastore 220.

In some embodiments of the invention, this method 300 of remedying a bad fix 110b ends with standard packaging of the parts 120 referenced by part maps 240 in the parts datastore 260. During standard packaging, the remedial fix 110r may be stored in the complete datastore 220 as a new fix object 230, and its dependencies may be recorded in the complete version of the dependency graph 210. The remedial fix 110r may be converted into an installable entity that includes binary data of the parts 120 referenced in the parts datastore 260 as well as required metadata, such as a prerequisite list and a superseded list, obtained from the new fix object 230. In some embodiments of the invention, the resulting installable entity is then ready to be distributed to customers. Additionally, the packaging tool 205 or another developer tool may maintain a record of the most recent fix 110 for each part 120 of the software product. Thus, in some embodiments of the invention, when the remedial fix 110r is released, records of the included parts 120 of the remedial fix 110r may be updated to reference the remedial fix 110r as the most recent update.

In some embodiments of the invention, as a result of this method 300, all part versions in all known bad fixes 110b and in all fixes 110 dependent on the bad fixes 110b are changed to have a FixID that matches the remedial fix 110r. Additionally, in some embodiments of the invention, the most recently committed version of each such part 120 is added to the parts datastore 260 for inclusion in the remedial fix 110r. The most recently committed version of each such part 120 may be incorporated, and packaged together, into the remedial fix 110r, which thereby supersedes the bad fix 110b and all fixes 110 dependent on the bad fix 110b. In other words, the packaging tool 205 generates a superseding fix 110. Thus, when the remedial fix 110r is installed on a customer's computer system, the installation will not require the bad fix 110b or any fix 110 dependent on the bad fix 110b.

Figure 4:
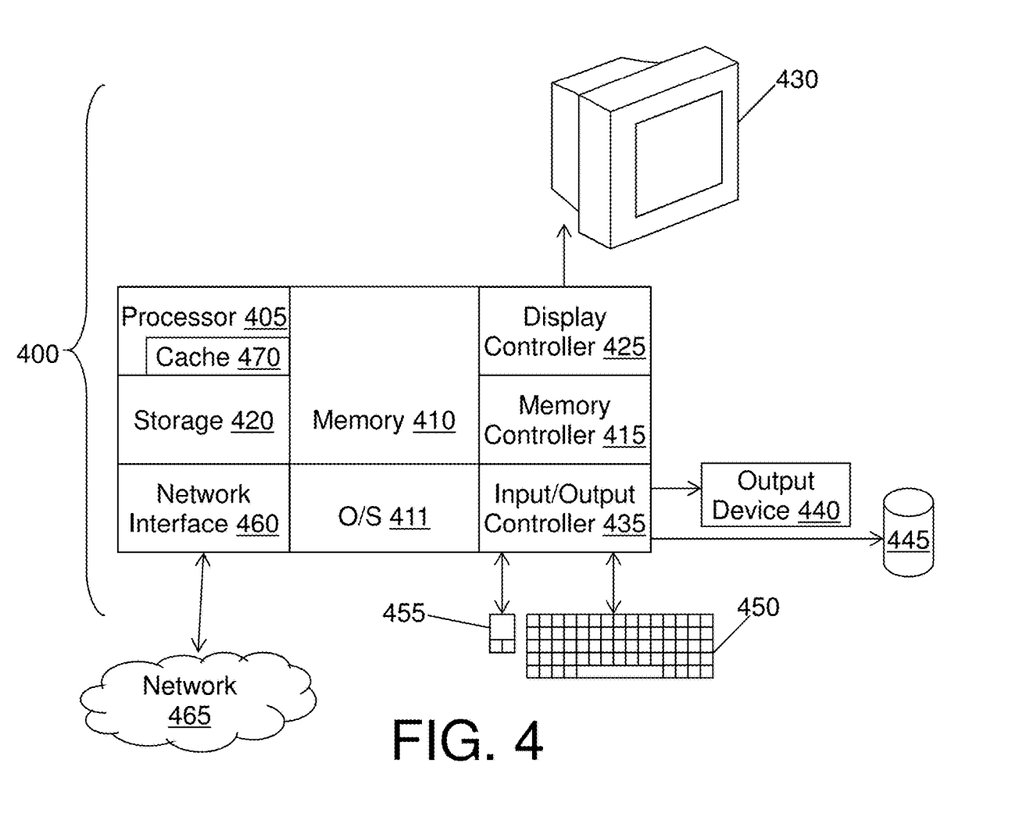
FIG. 4 is a block diagram of a computer system for implementing some or all aspects of the packaging system, according to some embodiments of this invention.

FIG. 4 is a block diagram of a computer system 400 for implementing some or all aspects of the packaging system 100, according to some embodiments of this invention. The packaging systems 100 and methods described herein may be implemented in hardware, software (e.g., firmware), or a combination thereof. In some embodiments, the methods described may be implemented, at least in part, in hardware and may be part of the microprocessor of a special or general-purpose computer system 400, such as a personal computer, workstation, minicomputer, or mainframe computer. For example, and not by way of limitation, the packaging tool 205 may be one or more computer systems 400 or portions thereof, or may run on one or more computer systems 400.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor-based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid-state drive. The stored instructions in memory 410 or in storage 420 may include those enabling the processor to execute one or more aspects of the packaging systems 100 and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Packaging systems 100 and methods according to this disclosure may be embodied, in whole or in part, in computer program products or in computer systems 400, such as that illustrated in FIG. 4.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   identifying a bad fix to a software product, wherein the software product comprises a plurality of parts, and wherein the bad fix presents an error into a first part of the software product,
   wherein a plurality of fixes to the software product are representable by a dependency graph indicating dependencies among the plurality of fixes to the software product, and wherein the bad fix is among the plurality of fixes;
   recursively traversing the dependency graph to identify a subset of fixes that are dependent on the bad fix, wherein each fix in the subset of fixes comprises a respective set of parts and a commit identifier that indicates a chronological order of the fix being committed relative to other fixes in the subset of fixes;
   wherein the recursively traversing the dependency graph to identify a subset of fixes that are dependent on the bad fix comprises:
      adding a bad fix object to a temporary datastore for examination, wherein the bad fix object indicates a respective set of dependent fixes that are directly dependent on the bad fix; and
      recursively adding to the temporary datastore a respective set of dependent fix objects representing each respective set of dependent fixes that are dependent on a fix for which a respective fix object is in the temporary datastore;
      wherein the temporary datastore references the bad fix and the subset of fixes that are dependent on the bad fix;
   sorting the fixes in the subset of fixes into a chronological order based on the commit identifiers of the fixes in the subset of fixes;
   based on the sorting, identifying a most recent version of each part included in the subset of fixes, wherein at least two of the identified parts are from different fixes in the subset of fixes;
   adding a reference in a parts datastore to the most recent version of each part included in the subset of fixes;
   generating a single remedial fix that supersedes all of the fixes in the subset of fixes and consists of computer code for a remedial part and computer code for the most recent version of each part referenced in the parts datastore, wherein the remedial part comprises a correction to the error in the first part, and wherein only a subset of the plurality of parts of the software product are updated in response to the remedial fix being applied to the software product; and
   wherein the fixes in the subset of fixes sorted in the chronological order are stored in the temporary datastore, and wherein the recursively traversing the dependency graph to add a reference in a parts datastore to the most recent version of each part included in the subset of fixes comprises:
   iterating over the subset of fixes in the temporary datastore, after the sorting; and
   adding to the parts datastore a respective reference to each part of the subset of fixes that is not yet found in the parts datastore, while iterating over the subset of fixes in the temporary datastore.

2. The computer-implemented method of claim 1, further comprising changing, to a fix identifier of the remedial fix, a respective fix identifier of each part of each of the subset of fixes referenced in the temporary datastore.

3. The computer-implemented method of claim 1, further comprising canceling each fix referenced in the temporary datastore.

4. The computer-implemented method of claim 1, wherein the remedial fix is installable on a computer system having the software product and the bad fix, regardless of which of the subset of fixes that are dependent on the bad fix are installed on the computer system.

5. A system comprising:
   a memory having computer-readable instructions; and
   one or more processors for executing the computer-readable instructions, the computer-readable instructions comprising:
      identifying a bad fix to a software product, wherein the software product comprises a plurality of parts, and wherein the bad fix presents an error into a first part of the software product,
      wherein a plurality of fixes to the software product are representable by a dependency graph indicating dependencies among the plurality of fixes to the software product, and wherein the bad fix is among the plurality of fixes;
      recursively traversing the dependency graph to identify a subset of fixes that are dependent on the bad fix, wherein each fix in the subset of fixes comprises a respective set of parts and a commit identifier that indicates a chronological order of the fix being committed relative to other fixes in the subset of fixes;
   wherein the recursively traversing the dependency graph to identify a subset of fixes that are dependent on the bad fix comprises:
      adding a bad fix object to a temporary datastore for examination, wherein the bad fix object indicates a respective set of dependent fixes that are directly dependent on the bad fix; and recursively adding to the temporary datastore a respective set of dependent fix objects representing each respective set of dependent fixes that are dependent on a fix for which a respective fix object is in the temporary datastore;

wherein the temporary datastore references the bad fix and the subset of fixes that are dependent on the bad fix;

sorting the fixes in the subset of fixes into a chronological order based on the commit identifiers of the fixes in the subset of fixes;

based on the sorting, identifying a most recent version of each part included in the subset of fixes, wherein at least two of the identified parts are from different fixes in the subset of fixes;

adding a reference in a parts datastore to the most recent version of each part included in the subset of fixes;

generating a single remedial fix that supersedes all of the fixes in the subset of fixes and consists of computer code for a remedial part and computer code for the most recent version of each part referenced in the parts datastore, wherein the remedial part comprises a correction to the error in the first part, and wherein only a subset of the plurality of parts of the software product are updated in response to the remedial fix being applied to the software product; and wherein the fixes in the subset of fixes sorted in the chronological order are stored in the temporary datastore, and wherein the recursively traversing the dependency graph to add a reference in a parts datastore to the most recent version of each part included in the subset of fixes comprises:

iterating over the subset of fixes in the temporary datastore, after the sorting; and adding to the parts datastore a respective reference to each part of the subset of fixes that is not yet found in the parts datastore, while iterating over the subset of fixes in the temporary datastore.

6. The system of claim 5, the computer-readable instructions further comprising changing, to a fix identifier of the remedial fix, a respective fix identifier of each part of each of the subset of fixes referenced in the temporary datastore.

7. The system of claim 5, the computer-readable instructions further comprising canceling each fix referenced in the temporary datastore.

8. The system of claim 5, wherein the remedial fix is installable on a computer system having the software product and the bad fix, regardless of which of the subset of fixes that are dependent on the bad fix are installed on the computer system.

9. A computer-program product for generating a remedial fix to correct a bad fix, the computer-program product comprising a computer-readable storage medium having program instructions embodied therewith, the program instructions executable by a processor to cause the processor to perform a method comprising:

identifying a bad fix to a software product, wherein the software product comprises a plurality of parts, and wherein the bad fix presents an error into a first part of the software product;

wherein a plurality of fixes to the software product are representable by a dependency graph indicating dependencies among the plurality of fixes to the software product, and wherein the bad fix is among the plurality of fixes;

recursively traversing the dependency graph to identify a subset of fixes that are dependent on the bad fix, wherein each fix in the subset of fixes comprises a respective set of parts and a commit identifier that indicates a chronological order of the fix being committed relative to other fixes in the subset of fixes;

wherein the recursively traversing the dependency graph to identify a subset of fixes that are dependent on the bad fix comprises:

adding a bad fix object to a temporary datastore for examination, wherein the bad fix object indicates a respective set of dependent fixes that are directly dependent on the bad fix; and recursively adding to the temporary datastore a respective set of dependent fix objects representing each respective set of dependent fixes that are dependent on a fix for which a respective fix object is in the temporary datastore;

wherein the temporary datastore references the bad fix and the subset of fixes that are dependent on the bad fix;

sorting the fixes in the subset of fixes into a chronological order based on the commit identifiers of the fixes in the subset of fixes;

based on the sorting, identifying a most recent version of each part included in the subset of fixes, wherein at least two of the identified parts are from different fixes in the subset of fixes;

adding a reference in a parts datastore to the most recent version of each part included in the subset of fixes;

generating a single remedial fix that supersedes all of the fixes in the subset of fixes and consists of computer code for a remedial part and computer code for the most recent version of each part referenced in the parts datastore, wherein the remedial part comprises a correction to the error in the first part, and wherein only a subset of the plurality of parts of the software product are updated in response to the remedial fix being applied to the software product; and wherein the fixes in the subset of fixes sorted in the chronological order are stored in the temporary datastore, and wherein the recursively traversing the dependency graph to add a reference in a parts datastore to the most recent version of each part included in the subset of fixes comprises:

iterating over the subset of fixes in the temporary datastore, after the sorting; and adding to the parts datastore a respective reference to each part of the subset of fixes that is not yet found in the parts datastore, while iterating over the subset of fixes in the temporary datastore.

10. The computer-program product of claim 9, the method further comprising changing, to a fix identifier of the remedial fix, a respective fix identifier of each part of each of the subset of fixes referenced in the temporary datastore.

11. The computer-program product of claim 9, the method further comprising canceling each fix referenced in the temporary datastore.

* * * * *